(12) United States Patent
Hammar et al.

(10) Patent No.: US 10,913,158 B2
(45) Date of Patent: Feb. 9, 2021

(54) ROBOTIC SYSTEM

(71) Applicant: Caterpillar Inc., Deerfield, IL (US)

(72) Inventors: Jeremy Roe Hammar, Metamora, IL (US); Leon R. Adcock, Chillicothe, IL (US); Bradley Phillip Graham, Pierce County, WA (US); Matthew J. Behmlander, Metamora, IL (US); Joshua Clifton Short, Canton, IL (US); Donald A. Stickel, III, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 346 days.

(21) Appl. No.: 15/978,294

(22) Filed: May 14, 2018

(65) Prior Publication Data

US 2019/0344442 A1   Nov. 14, 2019

(51) Int. Cl.
*B25J 9/00* (2006.01)
*B25J 9/16* (2006.01)

(52) U.S. Cl.
CPC .......... *B25J 9/1674* (2013.01); *B25J 9/0009* (2013.01); *B25J 9/1615* (2013.01)

(58) Field of Classification Search
CPC ...... B25J 9/1674; B25J 9/1615; B25J 9/0009; G05B 2219/40263; G05B 2219/45104
See application file for complete search history.

(56) References Cited

U.S. PATENT DOCUMENTS

| 4,561,816 A | 12/1985 | Dingess |
| 2005/0216125 A1* | 9/2005 | Huston ................ B62D 55/265 700/258 |

FOREIGN PATENT DOCUMENTS

| CN | 203184850 | 9/2013 |
| KR | 20120122055 | 11/2012 |

* cited by examiner

*Primary Examiner* — Ian Jen

(57) ABSTRACT

A robotic system includes a robotic arm, a base couple coupled to the robotic arm, and a controller. The robotic supports a work implement and is configured to move the work implement to perform an operation on a workpiece. The base is configured to be removably coupled to a mounting surface. The controller is in communication with the robotic arm, the work implement, and the base. Further, the controller is configured to disable the operation of at least one of the robotic arm and the work implement if a coupling parameter between the base and the mounting surface is below a threshold value.

18 Claims, 3 Drawing Sheets

ROBOTIC SYSTEM

TECHNICAL FIELD

The present disclosure generally relates to a robotic system to perform a manufacturing operation on a workpiece, and more particularly, to a robotic system having a robotic arm adapted to be removably coupled to a mounting surface for performing a manufacturing operation on a workpiece.

BACKGROUND

Manufacturing operations, such as welding operations, may utilize a robotic arm to facilitate a holding and/or a movement of a work implement. While the use of robotic arms for performing manufacturing operations increases efficiency and quality of the work product, associated robotic systems may include relatively large permanent mounting systems to enable high precision location control needed for high quality work output. Therefore, associated robotic systems are generally expensive, and inflexible to a range of workpiece sizes and shapes.

Korean Published Patent Application No. 20120122055 relates to a portable welding robot having a base formed of a magnetic material. The base is attached to a workpiece magnetically for perforating a welding operation.

SUMMARY

In one aspect, the disclosure is directed towards a robotic system. The robotic system includes a robotic arm for supporting a work implement. The robotic arm is configured to move the work implement to perform an operation on a workpiece. The robotic system further includes a base coupled to the robotic arm. The base is configured to be removably coupled to a mounting surface. Furthermore, the robotic system includes a controller in communication with the robotic arm, the work implement, and the base. The controller is configured to disable the operation of at least one of the robotic anti and the work implement if a coupling parameter between the base and the mounting surface is below a threshold value.

In another aspect, the disclosure relates to a method for operating a robotic system. The robotic system includes a robotic arm for supporting a work implement and is configured to move the work implement to perform an operation on a workpiece. The method includes coupling a base, coupled to the robotic arm, to a mounting surface. The method further includes disabling, by a controller, an operation of at least one of the robotic arm and the work implement if a coupling parameter between the base and the mounting surface is below a threshold value.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
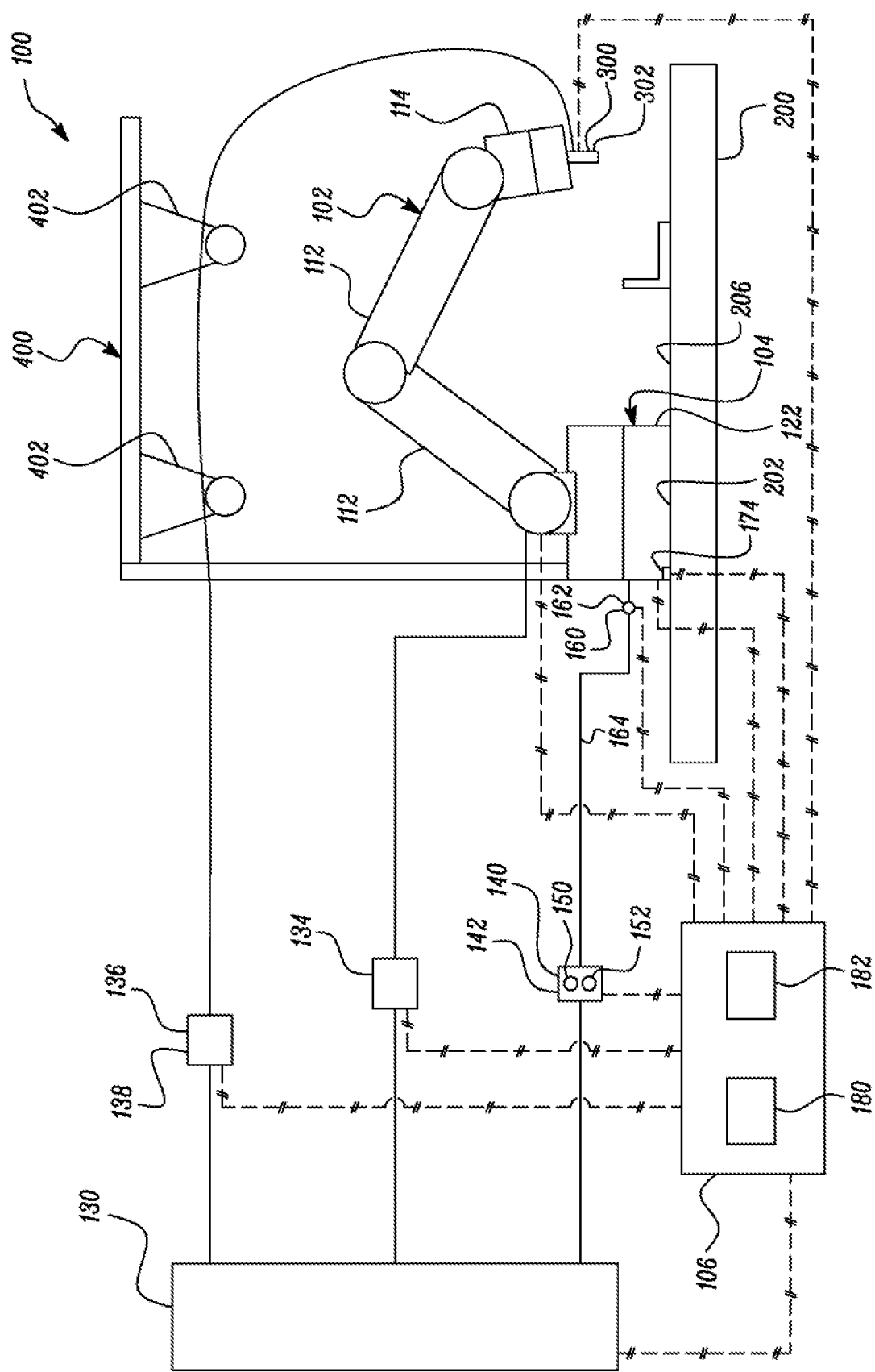
FIG. 1 is an exemplary robotic system h robotic arm and a base with an electromagnetic member for coupling the robotic arm with a mounting surface, in accordance with an embodiment of the present disclosure.
Figure 2:
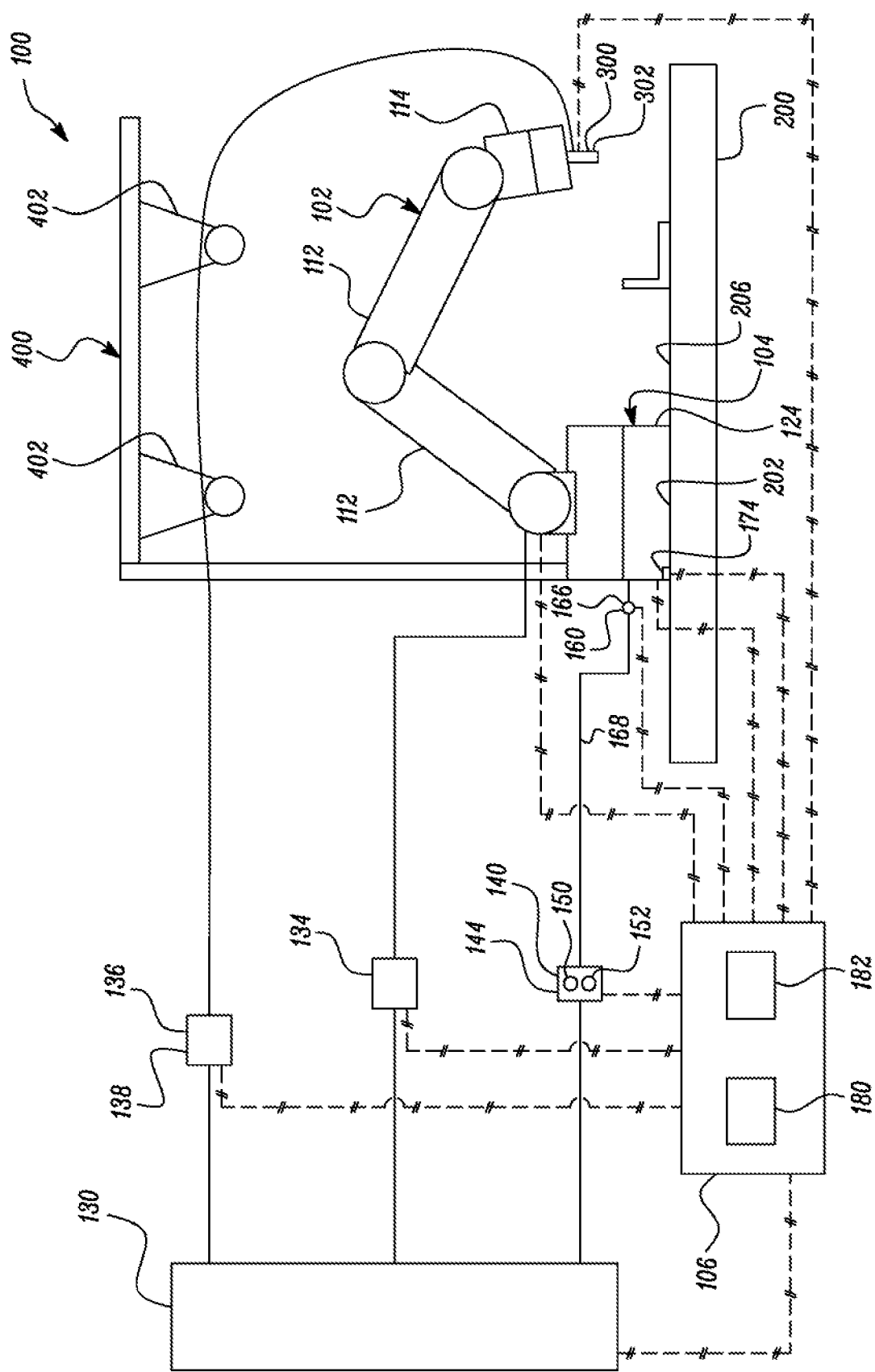
FIG. 2 is an exemplary robotic system having a robotic arm and a base with a fluid actuated clamp for coupling the robotic arm with a mounting surface, in accordance with an embodiment of the present disclosure, in accordance with an alternative embodiment of the present disclosure.
Figure 3:
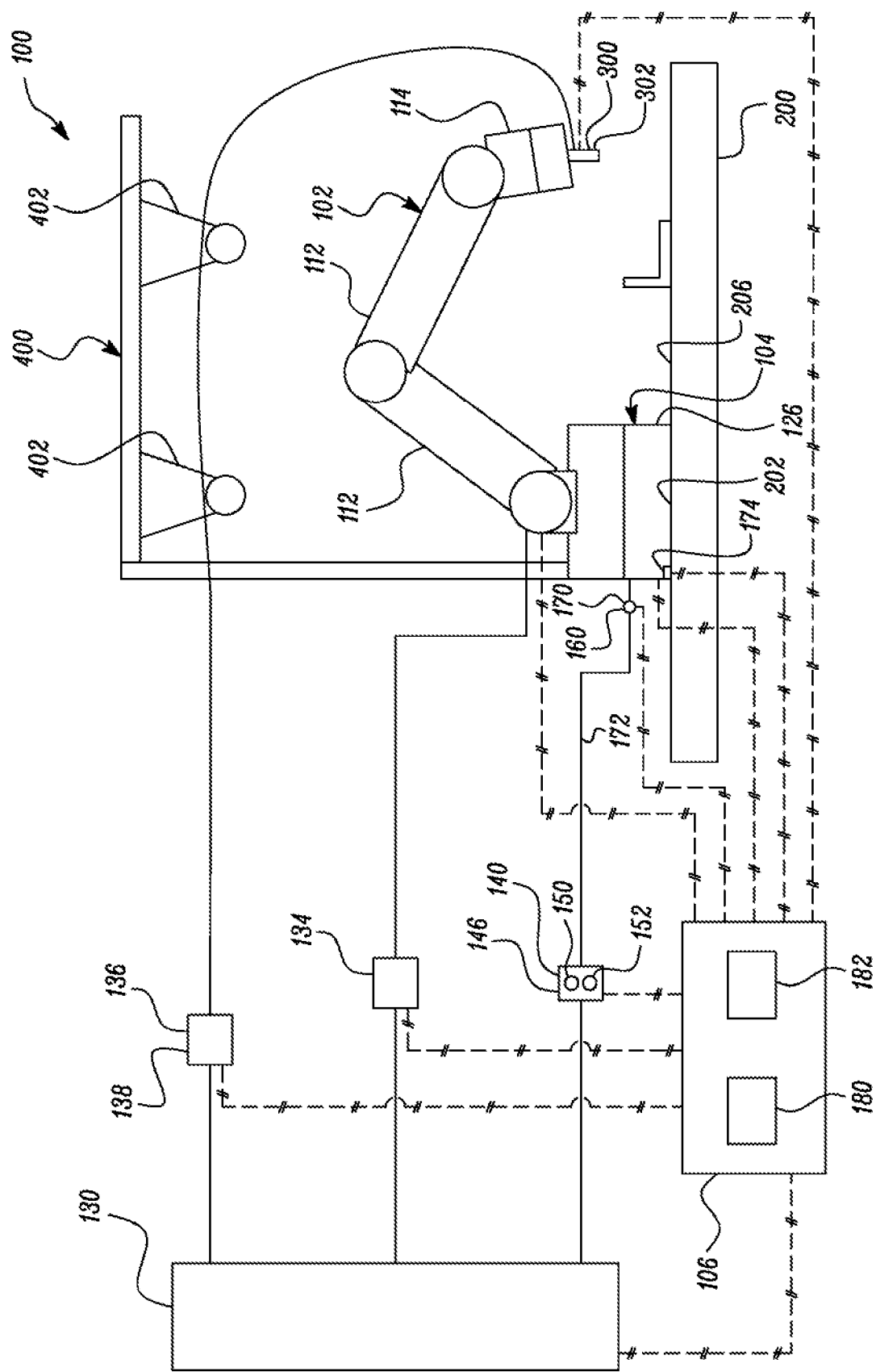
FIG. 3 is an exemplary robotic system having a robotic arm and a base with a vacuum holder for coupling the robotic arm with a mounting surface, in accordance with yet another embodiment of the present disclosure.

Referring to the drawings, wherein like reference numbers refer to like components, a robotic system 100 for performing a manufacturing operation is shown in FIGS. 1 to 3. The robotic system 100 includes a robotic arm 102, a base 104 coupled to the robotic arm 102, and a controller 106. The robotic system 100 may be an electric robotic system or may be any other type of robotic system 100. The robotic arm 102 may have multiple degrees of freedom of motion, as understood by those skilled in the art. To enable multiple degrees of freedom of motion, the robotic arm 102 may include one or more articulating linkages 112. Further, the robotic arm 102 may include an end effector 114 movably connected to the one or more articulating linkages 112. The end effector 114 may be attached to the one or more articulating linkages 112 to allow the robotic arm 102 to support (i.e., to grasp, move, and release) a work implement 300 to perform an operation, including but not limited to, loading parts, unloading parts, assembling, adjusting, welding, and inspecting, etc. The robotic arm 102 may include one or more actuators (not shown) for moving the one or more articulating linkages 112 and/or the end effector 114, and hence the robotic arm 102, on a programmed path for performing the operation (for example, a manufacturing operation) on the workpiece 200. The one or more actuators may be linear actuators, rotary actuators, or any combination thereof. Also, the one or more actuators may be electrically operated actuators (for example, electric motors), fluid operated actuators (for example, servo motors or pneumatic motors), or any combination thereof.

The robotic arm 102 is configured to be removably coupled to a mounting surface 202 to perform the operation (such as welding) on the workpiece 200 by removably coupling the base 104 to the mounting surface 202. The mounting surface 202 may be a floor, a surface 206 of the workpiece 200 as shown in FIGS. 1 and 3, a protrusion extending from a floor or the workpiece 200, or any other suitable mounting surface or structure. In an embodiment, the base 104 may include an electromagnetic member 122 (as shown in FIG. 1) to facilitate a coupling of the base 104 with the mounting surface 202. The electromagnetic member 122 may include one or more electromagnets (not shown) which may generate magnetic field when an electric power is provided. In certain other implementations (as shown in FIG. 2), the base 104 may include a fluid actuated clamp 124 for coupling the base 104 with the mounting surface 202. The fluid actuated clamp 124 may include one or more arms (not shown) which are operated by a fluid pressure to couple the base 104 with the mounting surface 202. In yet another embodiment (as shown in FIG. 3), the base 104 may include a vacuum holder 126 for coupling the base 104 with the mounting surface 202 (as shown in FIG. 3).

The robotic system 100 may further include a power unit 130 including one or more power sources for providing suitable power to the robotic arm 102, the base 104, and the work implement 300 for performing the operation. In an embodiment, the power unit 130 may include one or more electric power sources (such as a generator, a battery, etc.), one or more fluid power sources (such as a fluid pump), one or more vacuum pumps, or any combination thereof. In an embodiment, the power unit 130 may include a single power source for supplying power to all the components of the robotic system 100. In certain embodiments, the robotic system 100 may include multiple power sources, for example, three power sources may respectively power the base 104, the work implement 300, and the robotic arm 102. In an embodiment, the robotic system 100 may include a cable handling structure 400 including one or more brackets 402 to guide and hold one or more cables and/or power lines associated with the robotic system 100. The robotic system 100 may include one or more suitable mechanisms or structures to enable or disable a supply of power to each of the robotic arm 102, the base 104, and the work implement 300 to enable or disable respective operations of the robotic arm 102, the base 104, and the work implement 300.

In an embodiment, the robotic system 100 may include a switch 134 to enable or disable an operation (such as movements of the one or more linkages) of the robotic arm 102. In an embodiment, the switch 134 may control a supply of power from the power unit 130 to the robotic arm 102 for enabling or disabling the operation of the robotic arm 102. In an embodiment, the switch 134 may be activated to a first condition or a second condition. In the first condition, the switch 134 may be configured to allow a supply of power to the robotic arm 102 from the power unit 130 to enable the operation of the robotic arm 102, while, in the second condition, the switch 134 may be configured to interrupt or disable the supply of power to the robotic arm 102 to disable the operation of the robotic arm 102. In an embodiment, the switch 134 may be activated to the first condition or the second condition by the controller 106. In an embodiment, the switch 134 may be an electric switch, a pneumatic switch, for example, a pneumatic valve, a hydraulic valve, etc., depending on type of power being utilized to operate the robotic arm 102 (move the one or more articulating linkages 112 and/or the end effector 114).

Additionally, or optionally, the robotic system 100 may further include a switching structure 136 for enabling or disabling an operation of the work implement 300. Similar to the switch 134, the switching structure 136 may control a supply of power from the power unit 130 to the work implement 300 for enabling or disabling the operation of the work implement 300. In a first condition of the switching structure 136, the switching structure 136 may be configured to allow a supply of power to the work implement 300 from the power unit 130 to enable the operation of the work implement 300, while, in a second condition of the switching structure 136, the switching structure 136 may be configured to interrupt or disable the supply of power to the work implement 300 to disable the operation of the work implement 300.

In an exemplary embodiment, the work implement 300 may be a welding implement 302 (shown in FIGS. 1 to 3), and the robotic system 100 may be configured to perform a welding operation on the workpiece 200. For so doing, an electric power may be provided to the welding implement 302 from the power unit 130 to perform a welding on the workpiece 200. In such a case, the switching structure 136 may be contemplated as an electric switch 138 configured to enable or disable a supply of electric power to the welding implement 302 from the power unit 130. It may be appreciated that the switching structure 136 may be any other suitable device configured to control a supply of power to the work implement 300 depending of the type of power being utilized for operating the work implement 300. For example, a fluid power may be supplied from the power unit 130 to operate the work implement 300 (such as to enable a rotation of a drill). In such a case the switching structure 136 may be contemplated as a valve.

Further, the robotic system 100 may include a base safety interlock 140 configured to be operated by an operator to control a power supply to the base 104 for coupling the base 104 to the mounting surface 202. The base safety interlock 140, when activated to a first state, may provide a power to the base 104 for coupling the base 104 to the mounting surface 202. Also, the base safety interlock 140, when activated to a second state, may disable a supply of power to the base 104. In an embodiment, as shown in FIG. 1, the base safety interlock 140 may an electrical switch 142 configured to control a supply of electric power to the electromagnetic member 122 of the base 104 from the power unit 130. In another implementation, as shown in FIG. 2, the base safety interlock 140 may be a valve 144 to control a supply of fluid power (i.e., pressurized hydraulic fluid or pressurized air) to the fluid actuated clamp 124 of the base 104 from the power unit 130. In another embodiment, as shown in FIG. 3, the base safety interlock 140 may be a suction valve 146 to control a suction pressure applied to the vacuum holder 126 of the base 104 from the power unit 130.

In certain embodiments, the base safety interlock 140 may include a first button 150 and a second button 152 to activate or position the base safety interlock 140 in the first state and the second state, respectively. Both the first button 150 and the second button 152 may be configured for actuation by the operator to activate a corresponding state of the base safety interlock 140. For example, the first state of the base safety interlock 140 is activated upon actuation of the first button 150 by the operator, while the base safety interlock 140 is activated to the second state when the operator actuates the second button 152 by pressing the second button 152. Although two different buttons are contemplated for activating the first state and the second state of the base safety interlock 140, it may be appreciated that a single button may also be possible for activating or positioning the base safety interlock 140 to a first state or the second state. In an exemplary scenario, the second state may be a default state of the base safety interlock 140, and for providing power to the base 104, the operator activates the first state of the base safety interlock 140 by pressing the single button. The base safety interlock 140 may be in communication with the controller 106 such that the controller 106 may detect the state of the base safety interlock 140.

The robotic system 100 may further include one or more sensors, for example, a first sensor 160, to detect a coupling parameter associated with the coupling of the base 104 with the mounting surface 202. In an embodiment, as shown in FIG. 1, the coupling parameter may be a voltage of electric power provided to the electromagnetic member 122 of the base 104 for generating magnetic field for magnetically coupling the base 104 with the mounting surface 202. Thus, electromagnetic member 122 couples the base 104 with the mounting surface 202 via a magnetic force. In such a case, a magnitude of the voltage applied to the electromagnetic member 122 may be proportional the magnetic field generated by the electromagnetic member 122. Therefore, in certain implementations, the voltage may provide an indication of a strength of the coupling between the base 104 and the mounting surface 202. To detect the voltage applied to the electromagnetic member 122, the first sensor 160 may be a voltage sensor 162. The voltage sensor 162 may be coupled to a power line 164 connecting the base safety interlock 140 to the base 104. The voltage sensor 162 is configured to communicate with the controller 106 and send a signal corresponding to the voltage measured by the voltage sensor 162. Although, the coupling parameter is contemplated as the voltage, it may be appreciated that current associated with the electric power provided to the electromagnetic member 122 may also be contemplated as the coupling parameter. In such as case, the first sensor 160 may be a suitable current sensor.

In an implementation, as shown in FIG. 2, the coupling parameter may be a fluid pressure of fluid power applied to the fluid actuated clamp 124 by the power unit 130 for facilitating a clamping of the fluid actuated clamp 124 to the mounting surface 202. In an embodiment, the fluid actuated clamp 124 may be a hydraulically actuated clamp or a pneumatically actuated clamp. The fluid pressure may be proportional to the strength of coupling between the mounting surface 202 and the fluid actuated clamp 124 of the base 104. The strength of coupling may refer to a clamping force with which the fluid actuated clamp 124 may be holding the mounting surface 202. To measure the fluid pressure applied or provided to the fluid actuated clamp 124 by the power unit 130, the first sensor 160 may be pressure sensor 166. The pressure sensor 166 may be disposed inside a fluid line 168 that provide fluid to the fluid actuated clamp 124. The pressure sensor 166 is configured to communicate with the controller 106 and send a signal corresponding to the fluid pressure measured by the pressure sensor 166.

In an implementation, as shown in FIG. 3, the coupling parameter may be a suction pressure of the vacuum holder 126 for facilitating a coupling of the mounting surface 202 with the base 104. The suction pressure is provided to the vacuum holder 126 by the power unit 130. In such a case, the suction pressure may be proportional to the strength of coupling between the mounting surface 202 and the base 104 (vacuum holder 126). To measure the suction pressure of the vacuum holder 126, the first sensor 160 may be a pressure sensor 170. The pressure sensor 170 may in communication with an interior of the vacuum holder 126 to measure the suction pressure inside vacuum holder 126 that facilitates a coupling or holding of the base 104 with the mounting surface 202. In an embodiment, the pressure sensor 170 may be disposed in a suction conduit 172 connecting the vacuum holder 126 with the power unit 130. The pressure sensor 170 is configured to communicate with the controller 106 and send a signal corresponding to the suction pressure measured by the pressure sensor 170.

Additionally, or optionally, the one or more sensors may also include second sensor 174 for measuring a force of coupling acting between the base 104 and the mounting surface 202. The second sensor 174 may be located on the base 104, and may be mounted at one or more surfaces of the base 104 that may abut and couple with the mounting surface 202. The second sensor 174 may measure a magnitude of the force acting between the base 104 and the mounting surface 202 to measure a strength of coupling between the base 104 and the mounting surface 202. The second sensor 174 may be a load cell having one or more degrees of freedom, a strain sensor, or any other appropriate sensor configured to measure force of coupling between the base 104 and the mounting surface 202. It may be appreciated that the coupling parameter, in an embodiment, may be the force acting between the base 104 and the mounting surface 202. In such a case, the first sensor 160 may be omitted. The second sensor 174 is configured to communicate with the controller 106 and send a signal corresponding to the force measured by the second sensor 174.

The controller 106 may be in communication with the robotic arm 102, the work implement 300, the base 104, the switch 134, the base safety interlock 140, the switching structure 136, the first sensor 160, the second sensor 174, and the power unit 130 to receive data and control the operation of the robotic system 100. The controller 106 may be embodied as a computer device having a processor 180 and a memory 182. Instructions embodying a method for controlling the operation of the robotic system 100 are stored in the memory 182 and are selectively executed by the processor 180 such that the controller 106 is programmed to execute all necessary steps of the method as per operational conditions. The input signals which drive the control steps executed by the controller 106 may include sensed information, e.g., as in a force signal from the second sensor 174, and/or coupling parameters signal generated by the first sensor 160, and/or information related to the state of the base safety interlock 140, and/or may include commands from the operator such as actuation of the first button 150 and/or the second button 152 of the base safety interlock 140.

Examples of the processor 180 may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor or any other processor.

The memory 182 may include tangible, non-transitory, computer-readable media such as read only memory (ROM), electrically-programmable read-only memory (EPROM), optical and/or magnetic media, flash memory, etc. Such memory is relatively permanent, and thus may be used to retain values needed for later access by the processor 180. Memory 182 may also include sufficient amounts of transitory memory in the form of random access memory (RAM) or any other non-transitory media.

In an embodiment, the controller 106 is configured to determine a magnitude of the coupling parameter based on a signal received from the first sensor 160 or the second sensor 174. The controller 106 is configured to compare the determined value of the coupling parameter to a threshold value. In an embodiment, the operation of the robotic arm 102 is disabled by the controller 106 when the coupling parameter is below the threshold value. For so doing, in an embodiment, the controller 106 may activate the second condition of the switch 134. In an embodiment, the controller 106 may disable the operation of the robotic arm 102 by stopping a supply of power to the robotic arm 102 by activating the second condition of the switch 134. In certain implementations, the operation of the work implement 300 is disabled by the controller 106 when the coupling parameter is below the threshold value. For so doing, in an embodiment, the controller 106 may activate the second condition of the switching structure 136. In an embodiment, the controller 106 may disable the operation of the work implement 300 by stopping a supply of power to the work implement 300 by activating the second condition of the switching structure 136. In some instances, the controller 106 may disable operations of both the robotic arm 102 and the work implement 300 when the coupling parameter is below the threshold value. In certain scenarios, the controller 106 may disable operations of either the robotic arm 102 or the work implement 300 when the coupling parameter is below the threshold value Additionally, or optionally, along with the coupling parameters detected by the first sensor 160, the controller 106 may also utilize the force measured by the second sensor 174 to control the operation of the robotic arm 102 and/or the work implement 300. In certain scenario, the coupling parameter detected by the first sensor 160 may be equal to or above the threshold value, while the force measured by the second sensor 174 may be below the corresponding threshold value. In such a case, according to an embodiment, the controller 106 may disable the operation of the robotic arm 102 and/or the work implement 300. In some other embodiments, the controller 106 may, at first, control the power unit 130 to augment the supply of power from the power unit 130 to the base 104 before disabling the operations of the robotic arm 102 and/or the work implement 300. Disablement of the operations of the robotic arm 102 and/or the work implement 300 may be prevented if the force measured by the second sensor 174 increases above the corresponding threshold value within a predetermined time duration. The controller 106 may disable the operations of both the robotic arm 102 and/or the work implement 300 if the force measured by the second sensor 174 remains below the threshold value even after a lapse of the predetermined time duration.

Further, in some embodiments, the controller 106 may monitor the base safety interlock 140, and disables the operation the robotic arm 102 and/or the work implement 300 based on the state of the base safety interlock 140. The controller 106 may disable the operation of the robotic arm 102 and/or work implement 300 if the controller 106 determines that the base safety interlock 140 is in the second state.

INDUSTRIAL APPLICABILITY

A working of the robotic system 100 according to the embodiment shown in FIG. 1 is discussed. For performing an operation on the workpiece 200, the robotic system 100 is utilized. For exemplary purpose, a welding operation on the workpiece 200 is discussed. To perform the welding operation, the robotic system 100 may be transported to a location of the workpiece 200. In an embodiment, the workpiece 200 may be a bucket of a shovel and is located at a worksite. To execute the welding operation, the robotic arm 102 is coupled to the workpiece 200 by coupling the base 104 with the mounting surface 202 of the workpiece 200. The base 104 is coupled to the mounting surface 202 by magnetically coupling the electromagnetic member 122 of the base 104 with the mounting surface 202. To enable the magnetic coupling, an electric power is provided to the electromagnetic member 122 from the power unit 130. The operator controls the supply of electric power to the electromagnetic member 122 by activating the base safety interlock 140. In an embodiment, the operator enables the supply of electric power to the electromagnetic member 122 by activating the base safety interlock 140 (electrical switch 142) to the first state.

The controller 106 may determine a magnitude of the voltage of the electric power provided to the electromagnetic member 122 to determine a strength of coupling between the base 104 and the mounting surface 202. The controller 106 may determine the magnitude of the voltage of the electric power supplied to the electromagnetic member 122 based on the signal received from the first sensor 160 (voltage sensor 162). The controller 106 may compare the determined voltage to the threshold value and disables an operation of the robotic arm 102 and/or the work implement 300 when the determined voltage is less than the threshold value. In an embodiment, the controller 106 may activate a second condition of the switch 134 to disable the operation of the robotic arm 102. In an embodiment, the controller 106 may stop a supply of power from the power unit 130 by activating the second condition of the switch 134 to disable the operation of the robotic arm 102. Also, the controller 106 may activate the second condition of the switching structure 136 (electric switch 138) to disable the electric power supply from the power unit 130 to the welding implement 302 to stop the welding operation on the workpiece 200.

In an embodiment, the first sensor 160 (voltage sensor 162) may be omitted. In such a case, the controller 106 may utilize the force measured by the second sensor 174 as the coupling parameter to control the operation of the robotic arm 102 and/or the welding implement 302. In another embodiment, both the voltage sensor 162 and the second sensor 174 may be incorporated into the robotic system 100, and in such a case, the controller 106 may utilize the force measured by the second sensor 174 as an additional input to control the operation of the robotic arm 102 and/or the welding implement 302 as described previously.

A working of the robotic system 100 according to the embodiment shown in FIG. 2 is discussed. For performing an operation (for example, a welding operation) on the workpiece 200, the robotic system 100 may be transported to a suitable location (i.e., to a location where the workpiece 200 is located). To execute the operation, the robotic arm 102 is coupled to the workpiece 200 by coupling the base 104 with the mounting surface 202. The base 104 is coupled to the mounting surface 202 by coupling the fluid actuated clamp 124 of the base 104 with the mounting surface 202. To enable the coupling, fluid under pressure is provided to the fluid actuated clamp 124 from the power unit 130. The operator controls the supply of fluid power (pressurized fluid) to the fluid actuated clamp 124 by activating the base safety interlock 140. In an embodiment, the operator enables the supply of the fluid power to the fluid actuated clamp 124 by activating the base safety interlock 140 (the valve 144) to the first state.

To detect a strength of coupling between the fluid actuated clamp 124 and the mounting surface 202, the controller 106 may determine a magnitude of the coupling parameter between the base 104 the mounting surface 202. In an embodiment, the coupling parameter may be a fluid pressure provided to the fluid actuated clamp 124 for clamping the base 104 to the mounting surface 202. In such a case, the controller 106 may determine the magnitude of the fluid pressure based on a signal received from the pressure sensor 166. The controller 106 may compare the determined fluid pressure to the threshold value and disables an operation of the robotic arm 102 and/or the work implement 300 (for example, welding implement 302) when the fluid pressure determined by the controller 106 is less than the threshold value.

In an embodiment, the controller 106 may activate a second condition of the switch 134 to disable the operation of the robotic arm 102. In an embodiment, the controller 106 may stop a supply of power from the power unit 130 to the robotic arm 102 by activating the second condition of the switch 134 to disable the operation of the robotic arm 102. Also, the controller 106 may activate the second condition of the switching structure 136 (electric switch 138) to disable the electric power supply from the power unit 130 to the work implement 300 (welding implement 302) to stop the welding operation on the workpiece 200.

In an embodiment, the first sensor 160 (pressure sensor 166) may be omitted. In such a case, the controller 106 may utilize the force measured by the second sensor 174 as the coupling parameter to control the operation of the robotic arm 102 and/or the work implement 300 (for example, the welding implement 302). In another embodiment, both the pressure sensor 166 and the second sensor 174 may be incorporated into the robotic system 100, and in such a case, the controller 106 may utilize the force measured by the second sensor 174 as an additional input to control the operation of the robotic arm 102 and/or the work implement 300 (welding implement 302) as described previously.

A working of the robotic system 100 according to the embodiment shown in FIG. 3 is discussed. For performing an operation (for example, a welding operation) on the workpiece 200, the robotic system 100 may be transported to a location where the workpiece 200 is located. To execute the operation, the robotic arm 102 is coupled to the workpiece 200 by coupling the base 104 with the mounting surface 202. The base 104 is coupled to the mounting surface 202 by coupling the vacuum holder 126 of the base 104 with the mounting surface 202. To enable the coupling, suction pressure is applied by the vacuum holder 126 onto the mounting surface 202. Suction pressure may be provided to the vacuum holder 126 by the power unit 130. The operator controls the supply of suction pressure of the vacuum holder 126 by activating the base safety interlock 140. In an embodiment, the operator enables the supply of the suction pressure to the vacuum holder 126 by activating the base safety interlock 140 (i.e., the suction valve 146) to the first state.

To detect a strength of coupling between the vacuum holder 126 and the mounting surface 202, the controller 106 may determine a magnitude of the coupling parameter between the base 104 and the mounting surface 202. In an embodiment, the coupling parameter may be the suction pressure applied to the mounting surface 202 by the vacuum holder 126. In such a case, the controller 106 may determine the magnitude of the suction pressure based on a signal received from the first sensor 160 (pressure sensor 170). The controller 106 may compare the suction pressure to the threshold value and disables an operation of the robotic arm 102 and/or the work implement 300 when the suction pressure determined by the controller 106 is less than the threshold value.

To disable the operation of the robotic arm 102, the controller 106 may stop the movement of the robotic arm 102 i.e., the movement of the one or more articulating linkages 112 and/or the end effector 114. For so doing, the controller 106 may activate the second condition of the switch 134. In an embodiment, the controller 106 may stop a supply of power from the power unit 130 to the robotic arm 102 by activating the second condition of the switch 134. Also, the controller 106 may activate the second condition of the switching structure 136 (electric switch 138) to disable the electric power supply to the work implement 300 (welding implement 302) to stop the operation (welding operation) on the workpiece 200.

In an embodiment, the first sensor 160 (pressure sensor 170) may be omitted. In such a case, the controller 106 may utilize the force measured by the second sensor 174 as the coupling parameter to control the operation of the robotic arm 102 and/or the work implement 300 (for example, the welding implement 302). In another embodiment, both the pressure sensor 170 and the second sensor 174 may be incorporated into the robotic system 100, and in such a case, the controller 106 may utilize the force measured by the second sensor 174 as an additional input to control the operation of the robotic arm 102 and/or the work implement 300 (welding implement 302) as described previously.

As, operations of the robotic system 100 can be reliably performed by coupling the robotic arm 102 to the mounting surface 202 without requiring large mounting structures as required by traditional robotic systems. Further, as the robotic arm 102 can be removably coupled to the mounting surface 202, the robotic system 100 can be transported to any location to perform a manufacturing operation, such as a welding operation. Therefore, the robotic system 100 may decrease a cost of the manufacturing operation. For example, the robotic system 100 can be transported to a worksite to perform a welding operation as part of periodic maintenance or service schedule, thereby saving a cost of transportation of the workpiece 200 as well as total maintenance time. Therefore, the robotic system 100 is a robot which can reliably perform various manufacturing operations.

What is claimed is:

1. A robotic system, comprising:
   a robotic arm for supporting a work implement and configured to move the work implement to perform an operation on a workpiece;
   a base coupled to the robotic arm, the base configured to be removably coupled to a mounting surface; and
   a controller in communication with the robotic arm, the work implement, and the base, the controller configured to disable the operation of at least one of the robotic arm and the work implement if a coupling parameter between the base and the mounting surface is below a threshold value,
   wherein the coupling parameter includes a force acting between the base and the mounting surface.

2. The robotic system of claim 1, wherein the base includes an electromagnetic member for coupling the base with the mounting surface via a magnetic force, and the coupling parameter further includes a voltage applied to the electromagnetic member.

3. The robotic system of claim 1, wherein the base includes a fluid actuated clamp for coupling the base with the mounting surface, and the coupling parameter further includes a fluid pressure applied to the fluid actuated clamp.

4. The robotic system of claim 1, wherein the base includes a vacuum holder for coupling the base with the mounting surface, and the coupling parameter further includes a suction pressure of the vacuum holder.

5. The robotic system of claim 1 further including a base safety interlock configured to be operated by an operator to control a power supply to the base for coupling the base to the mounting surface,
   wherein the controller disables the operation to at least one of the robotic arm and the work implement when the base safety interlock disables the power supply to the base.

6. The robotic system of claim 1 further including a switch, wherein
   the switch enables the operation of the robotic arm in a first condition, and
   the switch disables the operation of the robotic arm in a second condition.

7. The robotic system of claim 6, wherein the controller disables the operation of the robotic arm by activating the second condition of the switch.

8. The robotic system of claim 1 further including a switching structure, wherein
   the switching structure enables the operation of the work implement in a first condition, and
   the switching structure disables the operation of the work implement in a second condition.

9. The robotic system of claim 8, wherein the controller disables the operation of the work implement by activating the second condition of the switching structure.

10. The robotic system of claim 1, wherein the work implement is a welding implement.

11. A method for operating a robotic system, the robotic system including a robotic arm for supporting a work implement and configured to move the work implement to perform an operation on a workpiece, the method comprising:
coupling a base, coupled to the robotic arm, to a mounting surface; and
disabling, by a controller, an operation of at least one of the robotic arm and the work implement if a coupling parameter between the base and the mounting surface is below a threshold value,
wherein the coupling parameter includes a force acting between the base and the mounting surface.

12. The method of claim 11, wherein the base includes an electromagnetic member for coupling the base with the mounting surface via a magnetic force, and the coupling parameter further includes a voltage applied to the electromagnetic member.

13. The method of claim 11, wherein the base includes a fluid actuated clamp for coupling the base with the mounting surface, and the coupling parameter further includes a fluid pressure applied to the fluid actuated clamp.

14. The method of claim 11, wherein the base includes a vacuum holder for coupling the base with the mounting surface, and the coupling parameter further includes a suction pressure of the vacuum holder.

15. The method of claim 11 further including:
monitoring, by the controller, a base safety interlock to be operated by an operator and configured to control a power supply to the base; and
disabling, by the controller, the operation of at least one of the robotic arm and the work implement when the base safety interlock disables power supply to the base.

16. The method of claim 11, wherein disabling the operation of the robotic arm includes activating, by the controller, a condition of a switch, wherein the switch enables the operation of the robotic arm in a first condition and disables the operation of the robotic arm in a second condition.

17. The method of claim 11, wherein disabling the operation of the work implement includes activating, by the controller, a condition of a switching structure, wherein the switching structure enables the operation of the work implement in a first condition and disables the operation of the work implement in a second condition.

18. The method of claim 11, wherein the work implement is a welding implement.

* * * * *